Patented May 15, 1934

1,958,630

UNITED STATES PATENT OFFICE 1,958,630

SULPHONATION OF PETROLEUM OILS AND PRODUCT THEREOF

Hyman Limburg, Amsterdam, Netherlands, assignor, by mesne assignments, to The Patent and Licensing Corporation, New York, N. Y., a corporation of Massachusetts No Drawing. Application May 19, 1928, Serial No. 279,210. In the Netherlands June 1, 1927

2 Claims. (Cl. 260—159)

My invention concerns a process for the manufacture of emulsifying and stabilizing agents, particularly for use in manufacturing and stabilizing aqueous emulsions of water-insoluble or nearly water-insoluble substances such as mineral oils, vegetable oils, tar, asphalt, paraffin, sulphur, rubber, etc. and the invention concerns also the manufacture of dispersions made with the aid of said agents.

Agents having emulsifying and stabilizing properties in respect of dispersions have already been utilized in the manufacture of dispersions of the substances referred to above and examples of such agents are fatty acids, sulphonic acids, oxidized paraffin, i. e. paraffin blown with air, casein, glue, etc.

For example asphalt emulsions made with the aid of the usual stabilizing agents are if left alone stable as far as the dispersed state is concerned; they, however, possess the drawback that they are only stable to a small degree when subjected to coagulating influences such as the action of solutions of strong electrolytes added thereto or to the action of heat or cold such as freezing temperature.

Again the usual stabilizing agents do not permit or hardly permit of the satisfactory manufacture of stable emulsions with a very high percentage of the dispersed phase, for example 90%, for the principal reason that large amounts of the stabilizing agents, generally in solid condition, have to be present and these large amounts are sufficient impurities to render the concentrated emulsions unsatisfactory for technical application.

According to my invention very satisfactory stable emulsions can be manufactured with the aid of sulphonic acids or salts thereof or of products containing such acids or salts having the following characteristics and prepared as hereinafter described.

The sulphonic acids which I use according to my invention belong to the class derived from aromatic or hydroaromatic compounds. They have molecular weights of at least 250, they are soluble in water and insoluble in benzene, and their calcium salts are soluble in water and in solutions of calcium chloride.

The desired sulphonic acids or products containing them can be obtained, for example, by treating aromatic or hydroaromatic compounds or substances containing these compounds with sulphuric acid or oleum, if desired at raised temperatures.

For the purposes of my invention it is immaterial whether the emulsifying and stabilizing agents are prepared from the aromatic or hydroaromatic compounds or from mixtures of the same in a pure condition or whether they are prepared directly from mineral oils for instance from the waste products (sludge) resulting from the treatment of mineral oils with sulphuric acid or oleum.

Generally speaking the yield of the desired sulphonic acids is most satisfactory when a mineral oil, from which products soluble in liquid sulphur dioxide have been removed by treatment therewith is treated with sulphuric acid or oleum.

The following example, which deals with the refining of a spindle oil fraction, illustrates how the waste products, obtained by treatment of a mineral oil with sulphuric acid or oleum, may be utilized for the purpose of my invention, without, however, effecting any previous extraction with liquefied sulphur dioxide.

Mineral oil in the form of a spindle-oil fraction, which contains about 30% of aromatic compounds, is treated with a small percentage, about 5%, of sulphuric acid for the removal of the asphaltic substances. The oil from which the acid sludge has been removed is subjected to five subsequent treatments each with 10% of its weight of oleum (the oleum containing 20% free $SO_3$), the acid sludge being separated from the oil after each treatment with oleum. The acid sludges from the last two treatments with oleum are mixed and neutralized with an alkali hydroxide, alkali carbonate, alkali acetate or the like.

The sulphonated acids may be separated from the excess of sulphuric acid by salting out or by precipitating the sulphuric acid with an equivalent amount of barium chloride.

The sulphonic acids, which are obtained in this way, possess a high molecular weight, viz. above 250. A molecular weight above 250 is important because lower sulphonated acids such as benzenesulphonic acid ($C_6H_5SO_3H$), naphthalene-sulphonic acid ($C_{10}H_7SO_3H$) and the like are unsuitable as stabilizing agents. It is equally important that the calcium-salts of the sulphonic acids should be soluble in water and in a calcium chloride solution, for I have found that sulphonic acids obtained by treating mineral oils with oleum and having their calcium salts insoluble in a calcium chloride solution, do not protect emulsions prepared with their aid against the coagulating influence of solutions containing calcium ions and the like.

By means of the salts of the sulphonic acids prepared as above described and having the aforesaid characteristics, emulsions having extraordinary stability may be obtained. Thus, for example, an emulsion of asphalt in an aqueous medium may be prepared as follows:—

To an aqueous solution containing about 3% by weight of a mixture of alkali salts of sulphonic acid prepared as described above, a small excess of alkali hydroxide, carbonate, acetate, silicate or the like is added. 800 parts by weight of asphalt are added to 300 parts of this solution, under heating, and if desired under elevated pressure, whilst stirring until a homogeneous fine dispersion is formed which is immediately, or after diluting with water, suitable for use.

The emulsion prepared in this way possesses an extraordinarily great stability against various coagulating influences. Thus it may be mixed without detrimental effect with concentrated hydrochloric acid, lime, Sorrel cement, very concentrated salt solutions and the like. In addition it may be stored during a long period in a frozen condition or boiled without losing its stability.

If it is desired to prepare emulsions, the stabilizing agent of which consists of salts of the sulphonic acids other than alkali salts, or of the acids themselves, it is generally advantageous to prepare initially the emulsion with the aid of alkali salts of the sulphonic acids and then to treat this emulsion with solutions of calcium chloride or magnesium chloride and the like or with a mineral acid.

With the aid of the sulphonic acid prepared in accordance with my invention, dispersions may be obtained the particles of which possess a negative charge. It may be desirable in view of certain applications of the emulsions stabilized with the aid of the sulphonic acids, or of their salts, to change the charge of the dispersed particles beforehand, so that an emulsion with positively charged particles is obtained. This may be effected by adding to the dispersion various agents such as: albumins in weak acid solution, basic dyestuffs, solutions of salts of multivalent metals, hydrosols with positively charged particles, etc.

I have also found that the sulphonic acids or their salts tend to highly increase the stability of natural dispersions for example rubber latex, of artificial dispersions and of mixtures of natural and artificial dispersions. In these cases the stabilizer is added to the dispersions already formed. Such dispersions stabilized in this manner permit all known and described manipulations to be effected.

What I claim is:—

1. An emulsifying agent consisting of sulphonic acid derivatives of acid sludge obtained from the sulphonation of a petroleum spindle oil fraction which has previously been treated with at least 30% of strong sulphuric acid, said derivative being capable of forming calcium salts which are soluble in water and in calcium chloride solution.

2. An emulsifying agent consisting of a sulphonic acid derivative of acid sludge resulting from the sulphonation of a petroleum oil fraction which has previously been subjected to treatment with at least 30% of strong sulphuric acid, said derivative having a molecular weight above 250 and being soluble in water and capable of forming calcium salts which are soluble in water and in calcium chloride solution.

HYMAN LIMBURG.